United States Patent
Nam et al.

(10) Patent No.: US 8,738,273 B2
(45) Date of Patent: May 27, 2014

(54) EXHAUST GAS CONTROLLING METHOD OF ENGINE

(75) Inventors: Kihoon Nam, Gunpo (KR); Myoungho Sunwoo, Seoul (KR); Minkwang Lee, Seoul (KR); Yeongseop Park, Seoul (KR); Byounggul Oh, Hwaseong-si (KR)

(73) Assignees: Hyundai Motor Company, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 360 days.

(21) Appl. No.: 13/210,571

(22) Filed: Aug. 16, 2011

(65) Prior Publication Data

US 2012/0138027 A1    Jun. 7, 2012

(30) Foreign Application Priority Data

Dec. 6, 2010 (KR) .................. 10-2010-0123587

(51) Int. Cl.
*F02D 41/24* (2006.01)

(52) U.S. Cl.
USPC ........................... 701/108; 123/568.16

(58) Field of Classification Search
CPC ......... F02D 41/00; F02D 41/14; F02D 41/24; B60W 10/06; F02M 25/07
USPC .......... 701/102, 103, 106, 108, 115; 123/568.16, 568.21, 568.25, 568.26, 123/568.29; 73/114.74
See application file for complete search history.

(56) References Cited

U.S. PATENT DOCUMENTS

| | | | |
|---|---|---|---|
| 5,724,950 A * | 3/1998 | Shino et al. | 123/676 |
| 6,019,094 A * | 2/2000 | Itoyama | 123/676 |
| 6,802,302 B1 * | 10/2004 | Li et al. | 123/568.16 |
| 2003/0029233 A1 * | 2/2003 | Ting et al. | 73/118.1 |
| 2003/0075158 A1 * | 4/2003 | Milos et al. | 123/568.21 |
| 2009/0192699 A1 * | 7/2009 | Bottcher et al. | 701/108 |
| 2010/0299046 A1 * | 11/2010 | Roduner et al. | 701/103 |

FOREIGN PATENT DOCUMENTS

| | | |
|---|---|---|
| KR | 10-0217460 B1 | 6/1999 |
| KR | 1020060067233 A | 6/2006 |
| KR | 100887968 B1 | 3/2009 |
| KR | 1020090064065 A | 6/2009 |

* cited by examiner

*Primary Examiner* — John Kwon
*Assistant Examiner* — Johnny Hoang
(74) *Attorney, Agent, or Firm* — Morgan, Lewis & Bockius LLP

(57) ABSTRACT

An EGR system control method of an engine may include calculating a target mass flux ($\dot{m}_{egr}^d$) of EGR gas flowing an EGR line, calculating an effective flowing area (EFA) of an EGR valve disposed on the EGR line, calculating an EGR flow sensitivity by dividing the target mass flux with the effective flowing area, and controlling a real opening rate of the EGR valve by applying the EGR flow sensitivity to a target opening rate of the EGR valve. Accordingly, a gain value is varied on a real time according to an effective flowing area of the EGR valve and a target mass flux of EGR gas such that real opening rate of an EGR valve is accurately and precisely controlled.

5 Claims, 4 Drawing Sheets

FIG. 3

① → Feedforward valve lift $$\text{FF EGR valve lift} = P_1 + P_2 \cdot EFA^d + P_3 \cdot (EFA^d)^2 + P_4 \cdot (EFA^d)^3$$

$$EFA^d = \dot{m}_{egr}^d \frac{\sqrt{R_{exh}T_{exh}}}{P_{exh}} \cdot \frac{1}{PR^{\frac{1}{k}}\sqrt{\left\{\frac{2k}{k-1}\left(1 - PR^{\frac{k-1}{k}}\right)\right\}}}, (if\ PR > P_{CR})$$

Target EGR mass flux → $\dot{m}_{egr}^d = \dot{m}_a - MAF^d$ $$\dot{m}_a = \frac{n_v \cdot P_{int} \cdot V_d \cdot N}{120}, P = \frac{P_{int}}{R \cdot T_{int}}$$

② → Controller gain $$\text{Sensitivity} = \frac{\dot{m}_{egr}}{EFA}$$

$$= \frac{P_{exh}}{\sqrt{R_{exh} \cdot T_{exh}}} PR^{1/\kappa} \times \left\{\frac{2\kappa}{\kappa - 1}\left(1 - PR^{(\kappa-1)/\kappa}\right)\right\}^{1/2}$$

where, $PR = \frac{P_{int}}{P_{exh}}$

EXHAUST GAS CONTROLLING METHOD OF ENGINE

CROSS-REFERENCE TO RELATED APPLICATION

This application claims priority to and the benefit of Korean Patent Application No. 10-2010-0123587 filed Dec. 6, 2010, the entire contents of which application is incorporated herein for all purposes by this reference.

BACKGROUND OF INVENTION

1. Field of Invention

The present invention relates to an exhaust gas control method of an engine that recirculates exhaust gas of an exhaust line to an intake line and precisely controls a flux of the recirculated exhaust gas.

2. Description of Related Art

Generally, an exhaust gas recirculation system is provided in most diesel engines that are equipped in a vehicle so as to take action with regard to exhaust gas regulations.

The exhaust gas recirculation system returns some of the exhaust gas exhausted from an engine to an intake device of a cylinder to lower combustion temperature of the engine and to decrease NOx thereof.

An EGR valve and an EGR cooler are disposed such that the EGR gas is cooled to a predetermined temperature to be supplied to the intake manifold.

The rotation speed of the engine and fuel injection amount are applied and the EGR valve is controlled by a feed forward control method so as to control the flux of the EGR gas, and a MAF detects the flux of the EGR gas.

Meanwhile, the flux of the EGR gas that is determined by the rotation speed and the fuel injection amount of the engine can be varied by several factors such that a real flowing of the EGR gas cannot be reflected and a feedback control can be interfered in a particular condition.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an exhaust gas control method of an engine having advantages of precisely controlling flux of exhaust gas that is recirculated from an exhaust line to an intake line, reducing a fuel consumption, and improving quality of exhaust gas.

An EGR system control method of an engine according to various embodiments of this invention may include calculating a target mass flux ($\dot{m}_{egr}^{d}$) of EGR gas flowing an EGR line, calculating a target effective flow area (EFA) of an EGR valve disposed on the EGR line, calculating an EGR flow sensitivity by dividing the EGR mass flux with the effective flow area, and controlling a real opening rate of the EGR valve by applying the EGR flow sensitivity to a target opening rate of the EGR valve.

The target mass flux of the EGR gas may be calculated by the following formula:

$$\dot{m}_{egr}^{d} = \dot{m}_a - MAF^d$$

Wherein $\dot{m}_{egr}^{d}$ is a target mass flux of the EGR gas, $MAF^d$ is a target mass flux of intake air, and $\dot{m}_a$ is a mass flux of air flowing into a cylinder.

The target effective flow area (EFA) may be calculated by the following formula:

$$EFA^d = \dot{m}_{egr}^{d} \frac{\sqrt{R_{exh}T_{exh}}}{P_{exh}} \cdot \frac{1}{PR^{\frac{1}{k}}\sqrt{\left\{\frac{2k}{k-1}\left(1 - PR^{\frac{k-1}{k}}\right)\right\}}},$$

(if $PR > P_{CR}$)

Wherein, $R_{exh}$ is a gas constant of exhaust gas, $T_{exh}$ is a temperature of exhaust gas, PR is a front/rear pressure ratio of the EGR valve, k is a specific heat ratio, and $P_{CR}$ is a critical pressure ratio of the orifice flow.

An exhaust gas control method of an engine according to various embodiments of the present invention calculates a target mass flux of EGR gas flowing an EGR line and applies an opening rate of the EGR valve thereby to control a flux of the EGR gas precisely and quickly. That is, a gain value is varied on a real time according to an effective flowing area of the EGR valve and a target mass flux of EGR gas such that real opening rate of an EGR valve is accurately and precisely controlled.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 shows control factors in an EGR system control method of an engine according to various embodiments of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
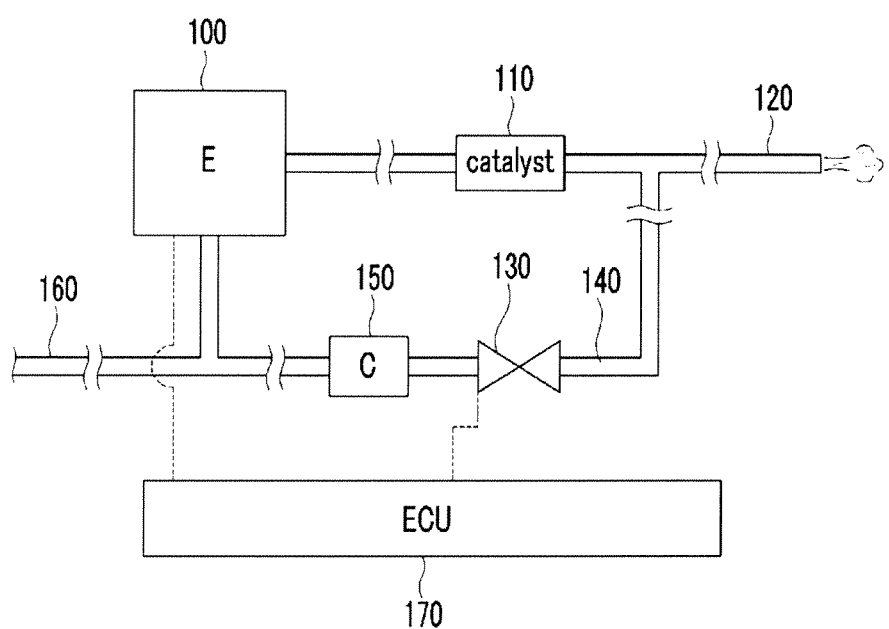
FIG. 1 is a schematic diagram of an EGR system of an engine according to various embodiments of the present invention.

FIG. 1 is a schematic diagram of an EGR system of an engine according to various embodiments of the present invention.

Referring to FIG. 1, an EGR system of an engine includes an engine 100, exhaust line 120, a catalyst 110, an intake line 160, an EGR line 140, an EGR valve 130, an EGR cooler 150, and a control portion 170.

Further, the EGR system includes a pressure difference sensor that detects a pressure difference between a front side and a rear side of the EGR valve 130, a EGR flux detection portion that detects a flux of EGR gas flowing the EGR line 140, and an intake air flux detection portion that detects a flux of intake air flowing the intake line 160.

The exhaust gas that is generated by the engine 100 is exhausted to the atmosphere, harmful materials thereof is reduced by the catalyst 110, and a part thereof is recirculated to the intake line 160.

The control portion 170 controls opening rate of the EGR valve 130 to accurately control EGR gas flowing the EGR line 140.

Figure 2:
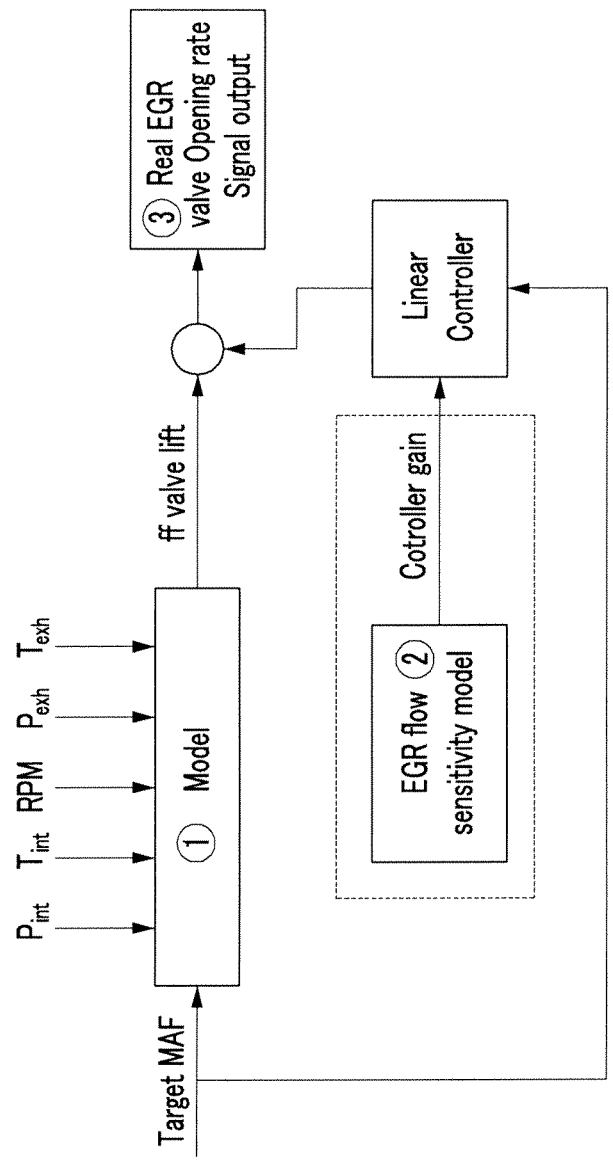
FIG. 2 is a flowchart showing an EGR system control method of an engine according to various embodiments of the present invention.

Referring to FIG. 2 and FIG. 3, a method for controlling an opening rate of an EGR valve will be described.

FIG. 2 is a flowchart showing an EGR system control method of an engine according to various embodiments of the present invention, and FIG. 3 shows control factors in an EGR system control method of an engine according to various embodiments of the present invention.

Referring to FIG. 2, the control portion 170 detects an intake pressure ($P_{int}$), an intake air temperature ($T_{int}$), an engine speed (RPM), an exhaust pressure ($P_{exh}$), and an exhaust temperature ($T_{exh}$), and performs ① model. Here, the Target MAF denotes a target intake air flux.

Referring to FIG. 3, the target EGR mass flux denotes a target mass flux of the EGR gas flowing the EGR line 140, and $\dot{m}_{egr}^d$ is calculated by an intake air mass flux ($MAF^d$) and air mass flux flowing into a cylinder ($\dot{m}_a$).

More particularly, a target EGR mass flux of the EGR gas is calculated by the following formula:

$$\dot{m}_{egr}^d = \dot{m}_a - MAF^d \quad \text{Formula 1}$$

Here, $\dot{m}_a$ is $$\frac{\eta_V \cdot \rho_{int} \cdot V_d \cdot N}{120},$$

$\eta_V$ is a volumetric efficiency of a cylinder, the $\rho_{int}$ is a density of intake air, $V_d$ is a stroke volume of a cylinder, N is an engine speed, the $\rho_{int}$ is $$\frac{P_{int}}{R \cdot T_{int}},$$

R is gas constant, and $T_{int}$ is a temperature of intake air.

Referring to FIG. 2, the control portion 170 detects an intake pressure ($P_{int}$), an intake air temperature ($T_{int}$), and an engine speed (RPM) as a driving condition, and performs ① model.

Referring to FIG. 3, the target EFA ($EFA^d$) is calculated by a target EGR mass flux $\dot{m}_{egr}^d$.

More particularly, the EGR flux model is used to calculate a target effective flow area (EFA) of the EGR valve 130 by the following formula:

$$EFA^d = \dot{m}_{egr}^d \frac{\sqrt{R_{exh} T_{exh}}}{P_{exh}} \cdot \frac{1}{PR^{\frac{1}{k}} \sqrt{\left\{\frac{2k}{k-1}\left(1 - PR^{\frac{k-1}{k}}\right)\right\}}}, \quad \text{Formula 2}$$

(if $PR > P_{CR}$)

Here, $R_{exh}$ is a gas constant of exhaust gas, $T_{exh}$ is a temperature of exhaust gas, PR is a front/rear pressure ratio of the EGR valve 130, k is a specific heat ratio, $P_{CR}$ is a critical pressure ratio of the orifice flow, and exhaust gas temperature and a front/rear pressure of the EGR valve 130 are detected by a pressure difference sensor and a temperature sensor.

Referring to FIG. 2, a target opening rate (FF valve lift) of the EGR valve 130 is calculated by the following formula:

$$EGR \text{ valve lift} = P_1 + P_2 \cdot EFA^d + P_3 \cdot (EFA^d)^2 + P_4 \cdot (EFA^d)^3 \quad \text{Formula 3}$$

Here, the formula 3 is a curve fitting formula that is made by a graph that is drawn by experimental data, the EGR valve lift denotes a target valve opening rate of the EGR valve 130, $P_1$, $P_2$, $P_3$, and $P_4$ are constants, and the $EFA^d$ denotes a target effective flow area. Further, the curve fitting formula can be varied according to a design specification of the valve.

A target valve opening rate of the EGR valve 130 that is calculated by the formula 3 is set as a target value of a feed forward control to control an opening of the EGR valve 130 in various embodiments of the present invention.

In the FIG. 2, the FF valve lift signifies that a valve opening (valve lift) is varied by a feed forward control method.

In the FIG. 2, the control portion performs a model ② (EGR flow sensitivity model) to calculate a controller gain for controlling, uses a linear controller to compensate a valve opening (EGR valve lift), and outputs an opening signal (real EGR valve opening signal output) for opening the EGR valve 130 in the model ③ according to various embodiments of the present invention.

Hence, a method for calculating an EGR gas flow sensitivity in the model ② will be described.

Referring to FIG. 3, the EGR gas flow sensitivity is calculated by dividing a target mass flux ($\dot{m}_{egr}^d$) of the EGR gas with an effective flowing area (EFA) of the EGR valve 130.

EGR gas flow sensitivity is calculated by the following formula.

$$\text{Sensitivity} = \frac{\dot{m}_{egr}}{EFA} \quad \text{Formula 4}$$

$$= \frac{P_{exh}}{\sqrt{R_{exh} \cdot T_{exh}}} PR^{\frac{1}{\kappa}} \times \left\{\frac{2\kappa}{\kappa - 1}(1 - PR^{(\kappa-1)/\kappa})\right\}^{\frac{1}{2}}$$

where, $PR = \frac{P_{int}}{P_{exh}}$

Generally, if a control gain is larger, a real control factor (an opening rate of the EGR valve in various embodiments) can be increased or can be varied along a predetermined frequency, and if a control gain is small, there is a problem that reaction speed of a controller becomes slow.

However, in various embodiments of the present invention, a sensitivity (gain value) is varied in a real time according to a mass flux of the EGR gas and a target effective flow area of the EGR valve such that a real opening rate of the EGR valve 130 is accurately and quickly controlled.

Accordingly, in a case that a sensitivity for a mass flux of the EGR gas is high, a gain value becomes smaller, and in a case that a sensitivity is low in a low load condition or a low RPM, a gain value becomes larger such that opening rate of the EGR valve 130 is not excessively larger or a reaction speed is not deteriorated in a real time.

Figure 4:
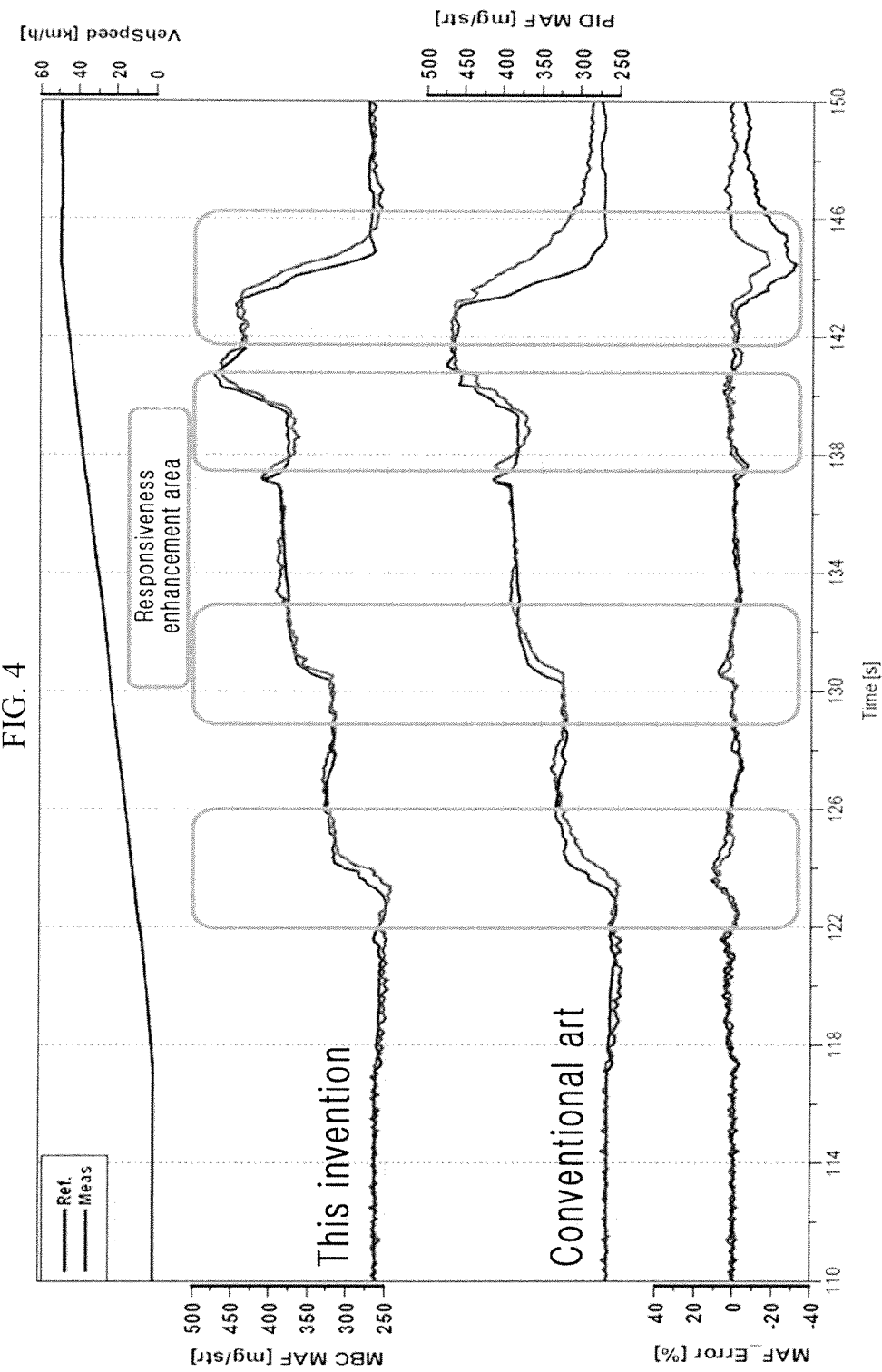
FIG. 4 is a graph showing an effect by an EGR system control method of an engine according to various embodiments of the present invention.

FIG. 4 is a graph showing an effect by an EGR system control method of an engine according to various embodiments of the present invention.

Referring to FIG. 4, a horizontal axis denotes a time, and a vertical axis denotes an error rate and a mass flux (MAF: Mass Air Flow) of the intake line 160.

As shown, Ref denotes a reference value of the intake mass flux, Meas. denotes a measured mass flux of the intake flow, and therein the measured value follows well the reference value. Further, it shows that the error rate ranges from 10 to 20% in almost areas.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An EGR system control method of an engine, the method comprising:
   calculating a target mass flux ($\dot{m}_{egr}^d$) of EGR gas flowing through an EGR line;
   calculating a target effective flow area (EFA) of an EGR valve disposed in the EGR line;
   calculating an EGR flow sensitivity by dividing the target mass flux with the effective flow area; and
   controlling a real opening rate of the EGR valve by applying the EGR flow sensitivity to a target opening rate of the EGR valve;
   wherein the target effective flowing area (EFA) is calculated by:

$$EFA^d = \dot{m}_{egr}^d \frac{\sqrt{R_{exh}T_{exh}}}{P_{exh}} \cdot \frac{1}{PR^{\frac{1}{k}}\sqrt{\left\{\frac{2k}{k-1}\left(1-PR^{\frac{k-1}{k}}\right)\right\}}},$$

(if $PR > P_{CR}$)

wherein $R_{exh}$ is a gas constant of exhaust gas, $T_{exh}$ is a temperature of exhaust gas, PR is a front/rear pressure ratio of the EGR valve, k is a specific heat ratio, and $P_{CR}$ is a critical pressure ratio of the orifice flow.

2. The EGR system control method of claim 1, wherein the target mass flux of the EGR gas is calculated by:

$$\dot{m}_{egr}^d = \dot{m}_a - MAF^d$$

wherein $\dot{m}_{egr}^d$ is a target mass flux of the EGR gas, $MAF^d$ is a measured mass flux of intake air, and $\dot{m}_a$ is a mass flux of air flowing into a cylinder.

3. The EGR system control method of claim 1, further comprising:
   scheduling a controller gain by using an EGR flow sensitivity.

4. An EGR system control system of an engine, comprising:
   an EGR line that transfers exhaust gas of an exhaust line to an intake line;
   an EGR valve that is disposed on the EGR line to control the EGR gas; and
   an ECU that controls the EGR valve, wherein the ECU performs:
   calculating a target mass flux ($\dot{m}_{egr}^d$) of EGR gas flowing an EGR line;
   calculating a target effective flow area (EFA) of an EGR valve disposed on the EGR line;
   calculating an EGR flow sensitivity by dividing the mass flux of EGR gas with the effective flow area; and
   controlling a real opening rate of the EGR valve by applying the EGR flow sensitivity to a target opening rate of the EGR valve;
   wherein the effective flowing area (EFA) is calculated by:

$$EFA^d = \dot{m}_{egr}^d \frac{\sqrt{R_{exh}T_{exh}}}{P_{exh}} \cdot \frac{1}{PR^{\frac{1}{k}}\sqrt{\left\{\frac{2k}{k-1}\left(1-PR^{\frac{k-1}{k}}\right)\right\}}},$$

(if $PR > P_{CR}$)

wherein $R_{exh}$ is a gas constant of exhaust gas, $T_{exh}$ is a temperature of exhaust gas, PR is a front/rear pressure ratio of the EGR valve, k is a specific heat ratio, and $P_{CR}$ is a critical pressure ratio of the orifice flow.

5. The EGR system control system of claim 4, wherein a mass flux of EGR gas is calculated by $$\dot{m}_{egr}^d = \dot{m}_a - MAF^d$$

wherein $m_{egr}^d$ target mass flux of the EGR gas, $MAF^d$ is a measured mass flux of intake air, and $\dot{m}_a$ is a mass flux of air flowing into a cylinder.

* * * * *